UNITED STATES PATENT OFFICE.

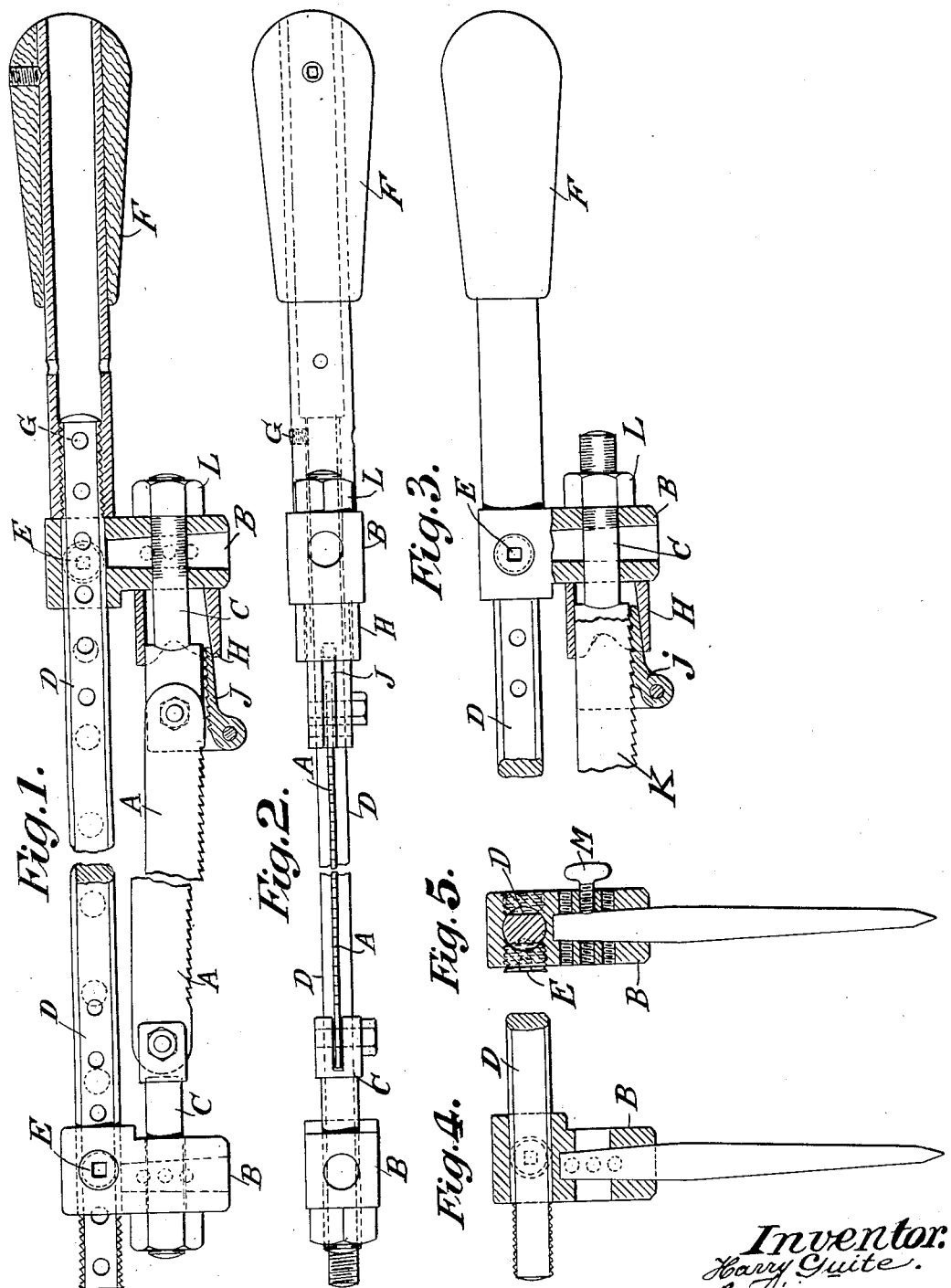

HARRY GUITE, OF RADCLIFFE, MANCHESTER, ENGLAND.

HACKSAW-FRAME.

1,370,809.  Specification of Letters Patent.  Patented Mar. 8, 1921.

Application filed December 8, 1920. Serial No. 429,162.

*To all whom it may concern:*

Be it known that I, HARRY GUITE, a subject of the King of Great Britain, residing at Radcliffe, Manchester, in the county of Lancaster, England, have invented certain useful Improvements in and Connected with Hacksaw-Frames, of which the following is a specification.

This invention relates to hack saw frames and has for its main objects to enable to be so used in the same saw frame, either new blades or broken blades, to enable the saw to be used in places inaccessible to the ordinary hack saw.

A hack saw frame in accordance with my invention comprises a back having a handle and two saw blade holders adjustable longitudinally on said back, both of said blade holders being provided with longitudinally adjustable members adapted to hold the unbroken ends of a saw blade in the usual manner and one of said members having combined with it means adapted to hold the broken end of a saw blade.

The handle of the hack saw is preferably arranged adjustable on and attachable to either end of the hack saw back.

The adjustable saw blade holders may be provided with sockets adapted to receive pointed members or a cutting tool, whereby the hack saw frame may be used for marking out or cutting washers and the like.

In order to enable the extremity of a hack saw blade to be employed where there is insufficient space for the entrance of the back of the frame, or where both ends of the saw blade are broken I may provide a substitute holder for that adapted to receive an unbroken end only, said substitute holder consisting of a short sleeve adapted to be secured on the end of the saw back and to grip the saw blade by friction at any part of its length. Said substitute holder can also be employed alone on the hack saw to hold short pieces of saw.

I attain these objects by the means illustrated in the accompanying drawings, in which—

Figure 1 is a front elevation partly in section of a hack saw frame carrying a whole saw blade.

Fig. 2 is an inverted plan view of Fig. 1.

Fig. 3 is a detached front elevation partly in section of the hack saw frame carrying a broken saw blade.

Figs. 4 and 5 are a sectional front view and a sectional end view respectively and illustrate the method of converting the hack saw frame into a pair of trammels or a cutter.

Similar letters refer to similar parts throughout the several views.

Figure 6:
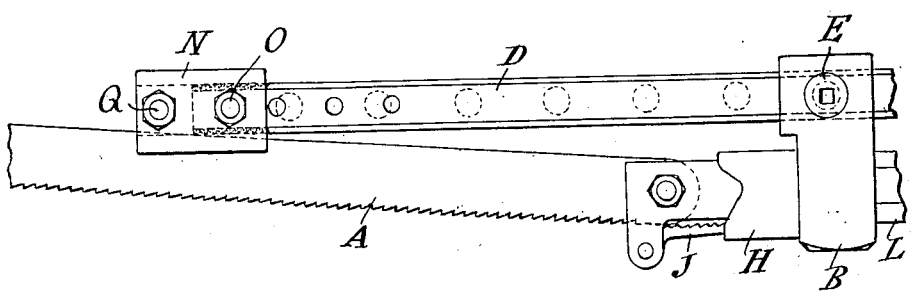
Fig. 6 is a detached front elevation of one end of the frame and illustrates another method of holding broken saw blades.

Referring to the drawings, the saw blade A is secured to the parts B by screws C. Parts B are attached to the back D of the saw frame by the screws E which enter into recesses in the back D. The handle F may be secured on either end and may be reversed to suit broken portion of blade. The handle F is secured to the back D by screws G which enter into the smaller recesses in D.

The sleeve H and gripper J, which latter is pivotally mounted on the split extension of the screw C, are not in use with a new saw blade. Fig. 3 shows means employed to grip the broken end of a saw blade. The broken end of the blade K is passed into part C. The serrations in the gripper J enter into the teeth of the blade K and are held there by the sliding sleeve H, the inner side of which is tapered to suit the taper back of the pivoted gripper J. The tightening of nut L draws the gripper forward and grips the saw blade K by the wedge action of the tapered parts already mentioned. Figs. 4 and 5 show the means for attachment of scriber points or cutting tools. It will be noticed that the parts B are bored taper, the scriber points or cutting tools having a corresponding taper. The attachments are secured in place by the thumbscrews M. In the event of both ends of the saw blade being broken, one end may be gripped in the parts C, H and J as previously described while the other end may be gripped by the means now to be described with reference to Figs. 6 to 8 of the drawings.

Figure 7:
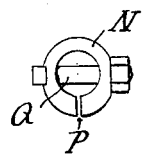
Fig. 7 is an end view of a detail.
Figure 8:
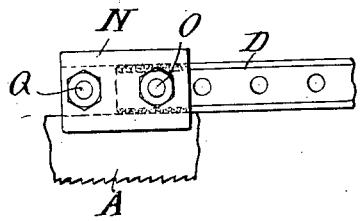
Fig. 8 is a detached front view of one end of the hack saw frame and illustrates another method of holding a broken saw blade.

A split sleeve N, is slipped on the outer end of frame back D and secured in position by a small bolt O and nut, which on being tightened, compresses the split sleeve N, and grips the saw blade A by friction in the slot P of the sleeve. The bolt O passes through both the split sleeve and the saw back and a second bolt Q and nut may be provided to pass through the sleeve only and aid in securing the saw blade A. This bolt can be clearly seen in Fig. 7 which shows an end view of the sleeve N. The split sleeve N may be used in conjunction with one of the saw holders, as illustrated by way of example in Fig. 6, or the split sleeve N above described may also be used alone to grip short pieces of saw A as illustrated in Fig. 8 and also when the blade is required to project past the end of saw back as illustrated in Fig. 6, thus enabling the saw to be used in situations where there is room only for the saw blade.

I claim:—

1. A hack saw frame including in combination, a frame back; saw blade holders adjustable on the frame back; a handle on the frame back for operating the saw; and means on said frame back and handle for adjusting the handle longitudinally of the frame back and attaching the handle to either end of the frame back.

2. A hack saw frame, comprising in combination, a frame back; a handle thereon for operating the saw frame; a saw blade holder removably secured to one end of the frame back; and means on said holder for gripping a saw blade adjacent its back edge at any part of its length, and leaving the greater part of the blade exposed and free for penetration into the work at the place of gripping.

3. A hack saw frame, comprising in combination a frame back; an adjustable saw blade holder arranged to slide thereon; an adjustable handle on the frame back; a split sleeve on one end of the frame back adapted to receive in its slit the back of a saw blade at any part of its length; means on the split sleeve for fixing it to the frame back; and means on the split sleeve for pressing the split therein together and thereby gripping the back of a saw blade inserted therein.

4. A hack saw frame, comprising in combination, a frame back; an adjustable saw handle thereon; two adjustable saw blade holders on the frame back; an adjustable member on one of said holders slotted to receive the extremity of a saw blade; means on the member to engage the attaching hole provided in a saw blade; an adjustable member on the other of said holders; a bifurcated end on said member; means for attachment of a saw blade thereto by means of one of its attaching holes; a serrated jaw pivotally mounted between the bifurcations of said member and adapted to engage the teeth of a saw blade; an internally tapered sleeve on said member operating on the jaw to force it into engagement with the saw teeth; a third holder adapted to be secured to the end of the frame back; screw means on said holder for fixing a saw blade thereto by clamping.

Signed at Manchester, in the county of Lancaster, England, this 22nd day of November, 1920.

HARRY GUITE.

Witnesses:
ALFRED BOSSHARDT,
MARY I. BOSSHARDT.